United States Patent [19]

Nakayashiki et al.

[11] Patent Number: 5,023,871

[45] Date of Patent: Jun. 11, 1991

[54] METHOD OF CONTROLLING THE OPERATION OF STATIONS IN A RING NETWORK

[75] Inventors: Susumu Nakayashiki, Sagamihara; Takeshi Harakawa, Hadano; Jiro Kashio, Kawasaki, all of Japan

[73] Assignee: Hitachi, Ltd., Tokyo, Japan

[21] Appl. No.: 343,901

[22] Filed: Apr. 27, 1989

[30] Foreign Application Priority Data

Apr. 28, 1988 [JP] Japan ................................ 63-103909

[51] Int. Cl.⁵ ................................................ H04J 3/00
[52] U.S. Cl. .............................. 370/85.500; 370/16.1; 370/85.15; 340/825.05
[58] Field of Search ........................ 370/16, 16.1, 85.2, 370/85.3, 85.4, 85.5, 85.7, 85.8, 85.12, 85.15, 95.2; 340/825.5, 825.51, 825.05

[56] References Cited

U.S. PATENT DOCUMENTS

| | | | |
|---|---|---|---|
| 4,566,098 | 1/1986 | Gammage et al. | 370/85.5 |
| 4,763,315 | 8/1988 | Hakayashiki et al. | 370/16 |
| 4,813,039 | 3/1989 | Yoshihiro | 370/85.5 |

OTHER PUBLICATIONS

ANSI/IEEE std. 802.5 "Token Ring Access Method and Physical Layer Specifications", 1985, pp. 73–76.

*Primary Examiner*—Douglas W. Olms
*Assistant Examiner*—Alpus H. Hsu
*Attorney, Agent, or Firm*—Antonelli, Terry, Stout & Kraus

[57] ABSTRACT

In a distributed network formed of communication stations having equal control functions, each station which sends a master station (or Active Monitor) determination frame appends a unique identifier to the frame, and each station which receives a frame judges the rationality of the received frame based on the identifier thereby to determine the operation of the self station depending on the result of judgement.

6 Claims, 3 Drawing Sheets

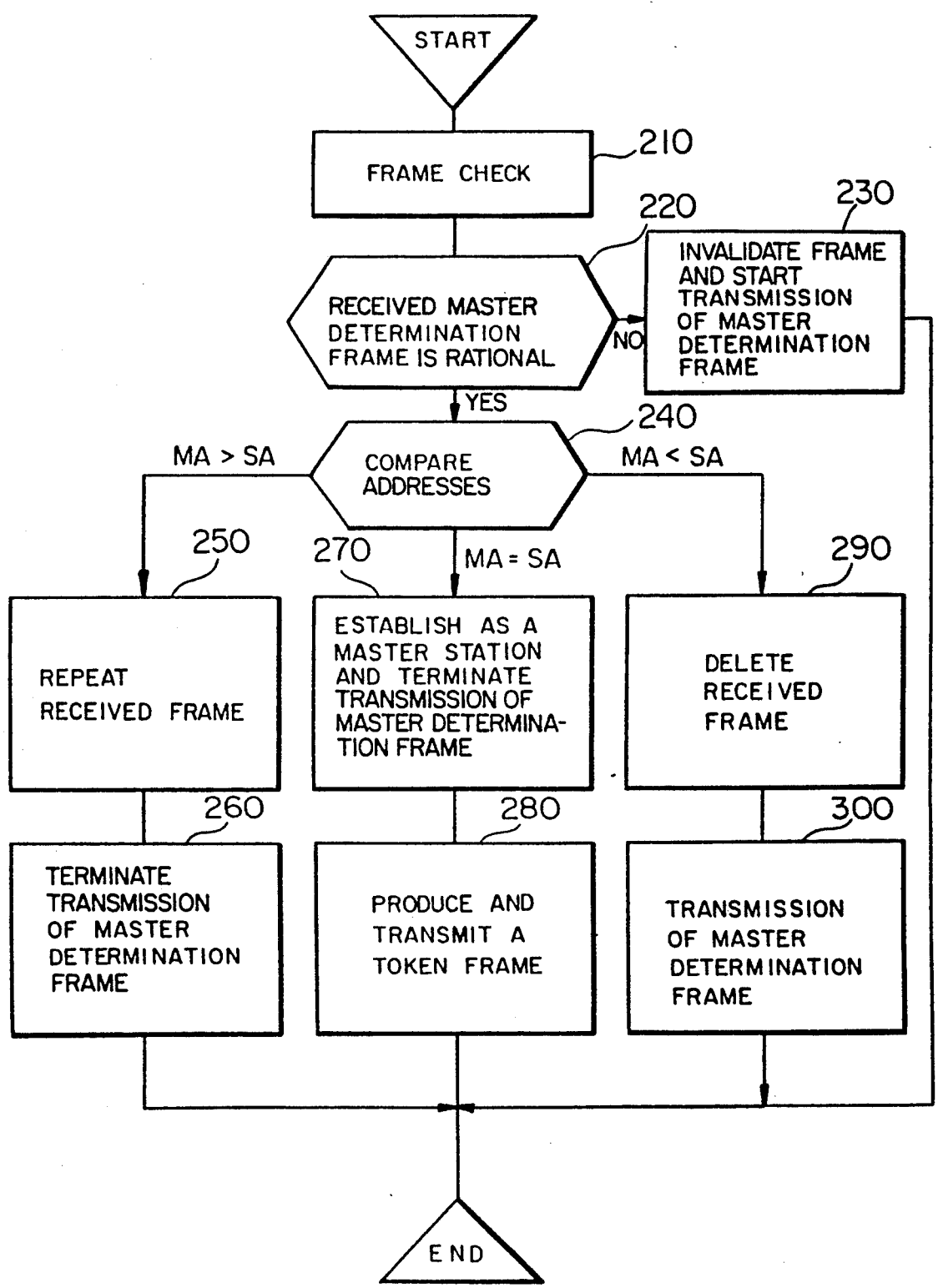

METHOD OF CONTROLLING THE OPERATION OF STATIONS IN A RING NETWORK

BACKGROUND OF THE INVENTION

This invention relates to a communication network system, and more particularly to a method of controlling the operation of stations in a distributed network system in which a plurality of stations are linked through a ring (or loop) transmission path.

A typical data communication system for a plurality of stations is known as a token ring network, as described in an article entitled "Token Ring Access Method and Physical Layer Specifications", IEEE Standard 802.5-1985 (ISO/DP8802/5). According to the above article, all stations included in the network are designed to have the same control logics, and the stations which are equal to one another constitute a network that is controlled distributively. Each station monitors, for example, a token which circulates along the ring transmission path, and if a station does not receive the token for a certain time length or longer, it determines the occurrence of an abnormality in the ring transmission path or in the communication function of any other station, issues an abnormality notice frame called a "beacon" and enters the control operation for locating the fault.

A station which receives a beacon issued by another upstream station on the ring transmission path ceases its generation of a beacon if it has been sending a beacon (beacon send mode), and it enters a status in which it repeats the received beacon by sending ti to the downstream station (beacon repeat mode). Through the operation of the above control logics, the station adjacent on the upstream side and stations capable of normal communication enter the beacon repeat mode one after another, and ultimately only one station located on the immediate downstream side of the fault point retains the beacon send mode. The station in the beacon send mode determines itself to be close to the fault point if it does not receive a beacon within a time period following the time it sent ut a beacon transmission.

After the fault point has been located, the station in the beacon send mode starts a reconfiguration operation for making a ring network which bypasses the fault point. The reconfiguration function was proposed in U.S. Pat. No. 4,763,315 and U.S. Pat. application Ser. No. 171,698.

When a closed ring is completed by the reconfiguration operation, the beacon goes around the ring and returns to the originating station. Upon receiving the beacon, the originating station checks the source address (SA) of the received beacon to judge whether it is the beacon sent by itself. If the station determines the received beacon to originate from itself, it confirms that a closed ring transmission path capable of normal communication is restored, removes the beacon from the ring transmission path, terminates the beacon send operation, creates a new token for the resumption of communication, and sends it over the transmission path. However, the above-mentioned beacon transmission and regeneration of token are carried out even in the case of a missing token due to a short-term network failure which can recover without invoking the reconfiguration operation.

The specifications of the above-mentioned IEEE standard, however, recovery of the network communication function satisfactorily in the following special circumstances.

Supposing a case in which the beacon sourcing station has been taken out of the ring as a result of the reconfiguration, for example, and thereafter the fault is restored, the station which is to remove the beacon placed on the ring no longer exists on the ring and therefore the beacon will continue to circulate. Moreover, all stations on the ring are in the beacon repeat mode and therefore no token is created even though the fault has been restored, leaving the ring communication function which is disabled.

Supposing another case in which more than one fault on the ring has been restored virtually at the same time, beacon sending stations adjacent to the respective fault points enter the beacon repeat mode because all of them can receive beacons sent from other stations. In this situation, each station does not check whether the received beacon is one it has sent, causing the beacons to circulate along the ring, and the problem similar to that mentioned above will arise.

These problems can be dealt with, in general, as a problem of a drifting frame (the above-mentioned beacon) for determining any one of the stations to be a master (or representative) station, i.e., a problem of infinite circulation of a master determination frame on a transmission path, in a distributed network.

The master (or representative) station mentioned here is a station which is located close to a fault point and sends a beacon continuously for a certain duration or longer, or a station such as an Active Monitor for creating a token and monitoring the normality of the token described in the above article which represents a plurality of stations equal to one another included in the network for implementing the control operation for maintaining a normal communication. Methods of resolving the contention of a master station include the one which is used in the above-mentioned beacon control, and the one which uses the comparison of address values. The latter method operates, at the occurrence of contention, to let each station repeat or relay only master station determination frames having source addresses larger than its own address for example, thereby allowing a frame including a maximum source address value to circulate on the ring and eventually determining a unique master station, i.e., one having the maximum address station. This method, however, is not free of the foregoing problems in case a master station determination frame including the maximum address drifts, e.g., when its source station gets out of the ring.

In a centralized control network in which a predetermined central control station controls the network, the above-mentioned problem of the drift of a master station determination frame does not arise. Instead, this problem is inherent is a distributed control network in which a specific station which controls the overall network does not exist and a plurality of stations in the network are provided with equal functions, such as that in which a frame sent over the ring is to be removed by the source station.

SUMMARY OF THE INVENTION

An object of this invention is to prevent the drift of a frame which determines a master station in a distributed control network.

Another object of this invention is to provide a method of controlling the operation of stations in a distributed control network capable of recovering the communication function promptly in the event of a fault.

A further object of this invention is to provide a method of appointing a master station from among a plurality of equal stations in a distributed control network.

The foregoing problems of a master station determination frame are attributed to the inability of each station to check the validity of master station determination frames at the time of reception. Namely, each station assumes all received frames to be valid and, as a result, a master station is not determined and the recovery of the communication function of the ring fails. In this case, if each station is capable of detecting an invalid master station determination frame, e.g., the above-mentioned beacon which is circulating the ring, an improper master station determination control can be avoided and, as a result, a master station can be determined and the communication function can be recovered promptly.

This invention is characterized in that each station included in a distributed control network confirms, based on its own judgment, the validity of a received master station determination frame. In order to examine the validity of the master station determination frame, a source station of the master station determination frame appends an identifier, which may be indicative of the time of transmission to the master station determination frame, for example, according to this invention. Each station which receives master station determination frames is provided with the ability of confirming the validity of the master station determination frame by checking the identifier. The identifier included in a master station determination frame may be a value which indicates the order of transmission, or a value which indicates the time of transmission, for example. Any identifier which allows the identification of a master station determination frame transmitted from one station is useful. A station which has received a master station determination frame checks the identifier to know whether or not the master station determination frame has been received in duplication, i.e., whether or not the master station determination frame is drifting on the ring. If the frame is determined to have been received more than once, it is invalidated, and the station initiates its own master station (or Active Monitor) determination control operation. If the received contentious frame includes an identifier which is different from that of an already received master station determination frame, the newly received master station determination frame is validated and each station retains the master station determination control operation.

These and other objects, advantages, manner of operation, and novel features of the present invention will be understood from the following detailed description taken in conjunction with the accompanying drawings.

BRIEF DESCRIPTION OF THE DRAWINGS

FIG. 5 is a flowchart showing the operation of the station which receives the master station determination frame.

DESCRIPTION OF THE PREFERRED EMBODIMENTS

Figure 1:
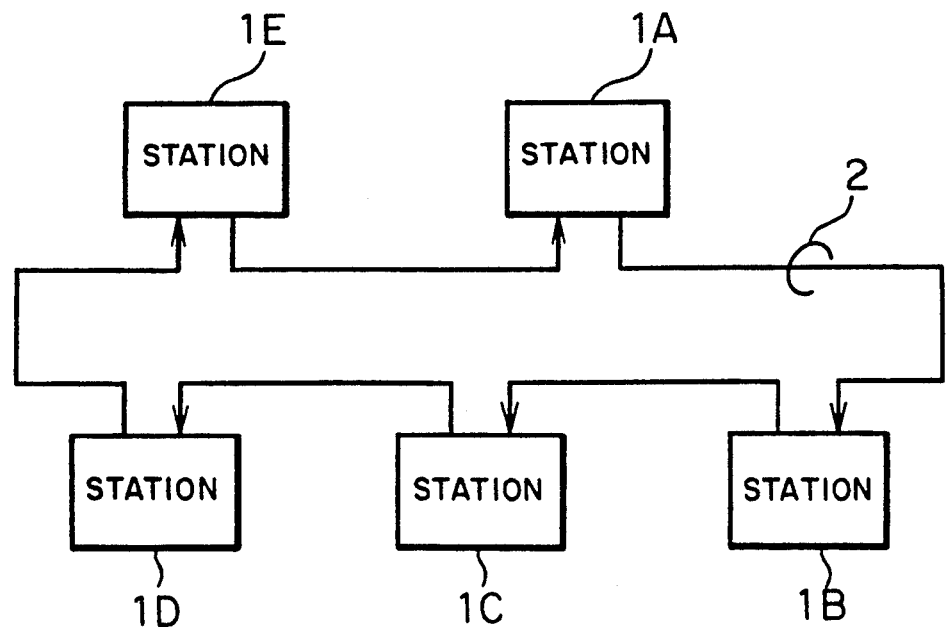
FIG. 1 is a diagram showing, as an example, the overall arrangement of a network to which this invention is applied.

FIG. 1 is a diagram showing, as an example, the overall arrangement of a distributed control network to which this invention is applied, including a plurality of communication stationa 1A-1E and a ring transmission path 2 interconnecting the stations. The transmission path 2 may be a double ring. An example of this type of network constituted by a plurality of stations operating on the basis of equally distributed control is the foregoing token ring (IEEE 802.5) LAN.

Figure 2:
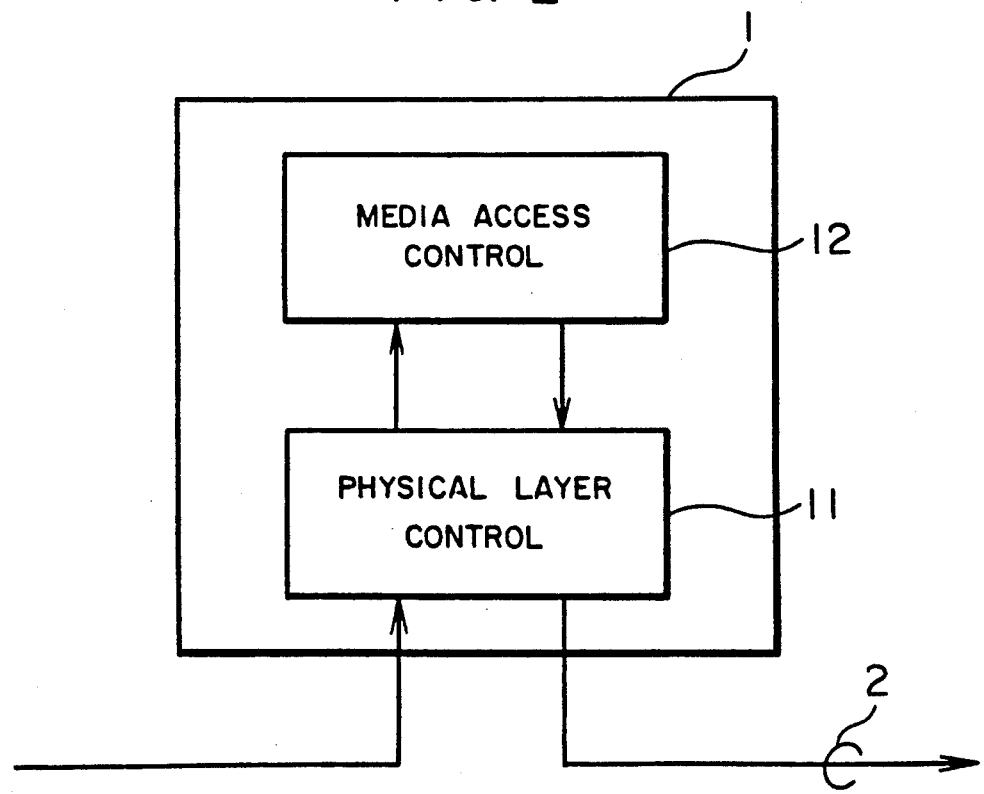
FIG. 2 is a block diagram of the communication station which constitutes the above network.

FIG. 2 shows in brief the arrangement of the station 1. Each station includes a communication circuit section 11 for communication control of the physical layer, and a communication circuit section 12 for communication control of the media access control layer (termed simply MAC hereinafter). Other circuit blocks included in each station, such as the interface with other communication stations in connection, are not directly related to this invention and they are not shown in the figure.

The following deals with the determination of a master station (that is a candidate master station) in the network. In this case, the master station can be a station located on the immediate downstream side of a fault point, as has been mentioned previously, or an Active Monitor which supervises the normal circulation of a token in the above-mentioned token ring LAN. Determination of a master station is to distinguish one of a plurality of stations which are related equally with one another. In this case, each station performs the master station (or Active Monitor) determination control operation through MAC-level information. This information (master station determination frame) is sent from the MAC 12. The MAC 12, upon receiving a master station determination frame from the transmission path, implements the master station determination control based on the information included in the frame. The master station determination control implemented here includes a method in which, for example, a station repeats only master station determination frames including source addresses smaller (or larger) than its own address so that only a master station determination frame with a minimum (maximum) address is allowed to circulate the network thereby to determine a specific station, i.e., a station having the minimum (maximum) address, to be the master station. The scheme of master station determination control is not related directly to this invention. The substance of this invention is to allow each station to determine as to whether or not the state of the currently running master station determination control is to be continued.

Figure 3:
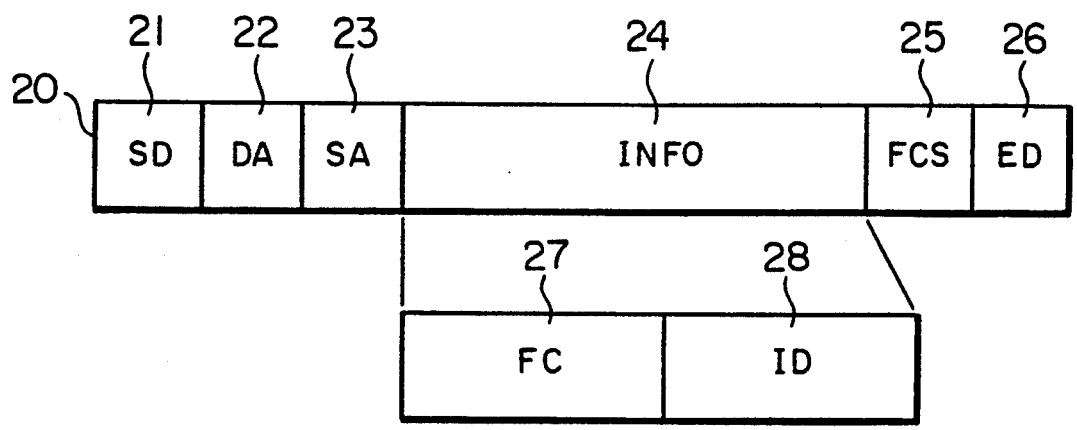
FIG. 3 is a diagram showing, as an example, the structure of the master station determination frame.

FIG. 3 shows, as an example, the structure of the master station determination frame 20. Indicated at 21 is a start delimiter (SD) indicative of the top of the frame, 22 is a destination address (DA) indicative of the destination of the frame, 23 is a source address (SA) indicative of the frame transmission source, 24 is a field (INFO) including information to be sent, 25 is a frame check sequence (FCS), and 26 is an end delimiter (ED) indicative of the end of the frame.

In accordance with this invention, a master station determination frame includes, in the information field 24, a function code (FC) indicating that this frame is a master station determination frame and an identifier (ID) 28 for identifying the time of transmission of the frame. The ID 28 may be a serial number which indicates the order of transmission time, a value which indicates the time of transmission, or any other value which can distinguish individual master station determination frames.

Figure 4:
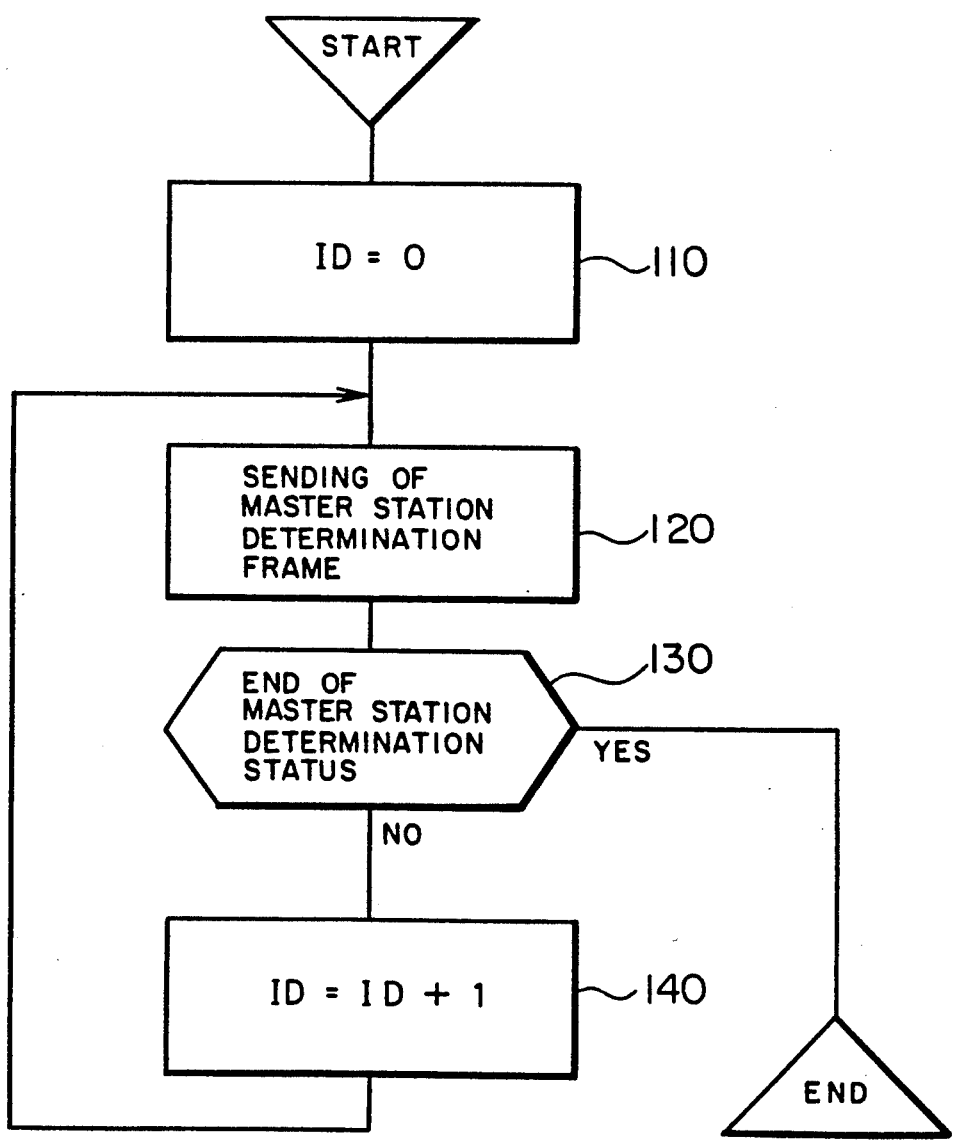
FIG. 4 is a flowchart showing the operation of the station which transmits the master station determination frame.

FIG. 4 is a flowchart of the program for the transmission of a master station determination frame executed by the MAC 12 in each station. The program is initiated at the detection of a fault in the network or at the start-up of the network, for example as mentioned previously. Initially, the first step 110 sets an initial value "0" to the counter which indicates the ID value to be appended to the transmission frame. Next, a master station determination frame which contains the ID counter value in its ID field 28 is created, and it is sent onto the ring transmission path by way of the physical layer circuit 11:(step 120). After that, a check is conducted as to whether the master station determination is completed:(step 130), and if it is not yet completed the ID is updated:(step 140) and the sequence returns to the step of frame creation and transmission 120. The transmission operation for the master station determination frames including different ID's continues until the master station determination completed. The completion of from determination transmission of a master station can be known, for example, by the reception of a master station determination frame which includes a source address smaller than its own address or by the reception of the master station determination frame having its own address in the reception operation for master station determination frames, as will be explained in detail with reference to FIG. 5.

FIG. 5 is a flowchart of the program which is executed by the MAC 12 at the time of reception of a master station determination frame. Upon receiving a master station determination frame, each station extracts the ID 28 to check the validity of the frame:(step 210). This check may be the usual serial number check used in data communication. Namely, serial numbers (ID's) of already received frames are memorized in correspondence to source addresses SA, and absence of data or duplication of data is detected from the values. The rationality of the received frame is checked:(step 220), and in case it is irrational the master station determination frame transmission operation described in connection with FIG. 4 is commenced:(step 230). If the received master station determination frame is rational, the following master station determination process will be executed. Irrationality mentioned here includes a case, for example, in which a newly received master station determination frame has its SA 23, FC 27, ID 28, etc. coincident with the counterparts of an already received master station determination frame, and in this case the master station determination process for the new frame is not carried out.

The master station determination process is, for example, to extract the source address SA from the received frame and compare it with the address assigned to its own station (self address) MA:(step 240). If the self address is larger than the source address (MA>SA), the received frame is repeated:(step 250), and the transmission operation for the master station determination frame (FIG. 4) from that station is terminated.

In case the self address MA is equal to the source address SA in the master station determination frame (MA=SA), the station established itself as the master station and completes the master station determination operation:(step 270). Subsequently, it notifies the end of master station determination to the other stations, creates a new token for the resumption of communication, and sends it onto the ring transmission path:(step 280). If the self address is smaller than the source address (MA<SA), the received master station determination frame is removed:(step 290), and the master station determination frame transmission operation for established that station as the source commences or proceeds:(step 300).

Although in the above example the master station determination frame sending station sets the ID in the master station determination frame and each receiving station judges the rationality based on the ID, the above ID may not be set, as another conceivable method. For example, when stations of a first group provided with the reconfiguration function and stations of a second group without the provision of the reconfiguration function coexist in a network, the above master station determination operation may be carried out by assuming that only master station determination frames having specific source addresses SA inherent to the first group are rational.

In addition, in order to speed up the recovery of the communication function, an alternative scheme may be adapted in which, when all master station determination frames have been received, the rationality check for the frames is omitted and the master station determination process (steps 240-300 in FIG. 5) is conducted for the all received master station determination frames, and thereafter the rationality check is conducted. In this case, if a master station determination frame is judged to be irrational, the result of a process which has been done is invalidated and the master station determination frame transmission operation is commenced. What is required is to carry out master station determination by checking the rationality of received master station determination frames, instead of validating all master station determination frames addressed to the self station.

We claim:

1.; A method of controlling the operation of stations in a network in which said stations are connected through at least one ring transmission path and one of said stations assigned to a station address having the highest priority works as a master station, said method comprising:

a step of transmitting from any one of said stations to said transmission path a series of frames for determining a master station, each of said frames including a source address indicative of a frame transmission source and an identifier specific to said frame;

a step of judging by each of said stations, upon receiving a frame for determining a master station transmitted from another station, whether or not the received frame has been received in duplication, on the basis of the source address and the frame-specific identifier included in said received frame;

a step of determining by each of said stations an operation mode of the station by comparing the source address of said received frame with an address assigned to the station as a part of a predetermined process for determining a master station among said stations if said judgment reveals that said received frame is not a duplicate; and a step of transmitting from any one of said stations to said transmission path a series of new frames for determining a master station to try again said predetermined process if the station has judged that said received frame is a duplicate.

2. A method according to claim 1, wherein, if it was judged in said judging step that said received frame from another station is not a duplicate, each of said stations selects a first operation mode of transmitting a series of frames for determining a master station from the station to said transmission path or a second operation mode of repeating the received frame to said transmission path depending on the result of said address comparison.

3. A method according to claim 2, wherein each of said stations, in the case of receiving a duplicate frame from another station when the station operates in the second mode, makes a transition from the second mode to a mode of transmitting a new series of frames and wherein one of said stations begins to operate as a master station after the station deletes a received frame including a source address assigned to the station.

4. A method of controlling the operation of stations in a network in which said stations having equal functions to one another are connected through at least one transmission path to form a ring and one of said stations which is assigned a station address having highest priority works as a master station, said method comprising:

a step of iteratively transmitting control frames for determining a master station from any one of said stations to said transmission path, each of said control frames including a source address indicative of a frame transmission source and an identifier specific to said control frame;

a step, taken by each of said stations when the station has received a control frame for determining a master station from another station, of judging whether or not the same control frame has been received in duplication, on the basis of the source address and the frame-specific identifier included in said received frame;

a step, taken by each of said stations, of determining an operation mode of the station by comparing the source address of said received control frame with an address assigned to the station to execute a predetermined process for determining one of said stations as a master station in case said judgment reveals that said received control frame is not a duplicate; and a step of changing an operation mode of any one of said stations to transit control frames for determining the master station to said transmission path again in order to retry said predetermined process from an initial state if the station is aware in said judging step that said received control frame is a duplicate.

5. A method according to claim 4, wherein, if it was judged in said judging step that said received control frame from another station is not a duplicate, each of said stations selects a first operation mode of transmitting control frames for determining a master station from the station to said transmission path or a second operation mode of repeating the received control frame to said transmission path depending on the result of said address comparison.

6. A method according to claim 5, wherein each of said stations, in the case of receiving a duplicate control frame from another station when the station operates in the second mode, makes a transition from the second mode to a mode of transmitting a new series of frames and wherein one of said stations begins to operate as a master station after the station deletes a received control frame including a source address assigned to the station.

* * * * *